United States Patent [19]
Jelich et al.

[11] Patent Number: 5,348,572
[45] Date of Patent: Sep. 20, 1994

[54] DEVICE FOR FILTERING HOT AND DUSTY GASES

[75] Inventors: Werner Jelich, Bochum; Heiko Rehwinkel, Bottrop; Friedrich Klauke, Ratingen; Dieter König, Hattingen; Udo Kalthoff, Mülheim/Ruhr, all of Fed. Rep. of Germany

[73] Assignee: Deutsche Babcock Energie- und Umwelttechnik Aktiengesellschaft, Oberhausen, Fed. Rep. of Germany

[21] Appl. No.: 98,592

[22] Filed: Jul. 28, 1993

[30] Foreign Application Priority Data

Aug. 7, 1992 [DE] Fed. Rep. of Germany ....... 4226146

[51] Int. Cl.⁵ .......................................... B01D 35/143
[52] U.S. Cl. .......................................... 96/113; 55/270; 55/274; 55/283; 55/288; 55/302
[58] Field of Search .............. 95/19, 20, 280, 25; 96/113; 55/270, 274, 283, 288, 302, 523

[56] References Cited

U.S. PATENT DOCUMENTS

| | | | |
|---|---|---|---|
| 4,500,926 | 2/1985 | Yoshimaru | 358/431 |
| 4,726,820 | 2/1988 | Stanelle | 55/283 X |
| 4,865,627 | 9/1989 | DeWitz et al. | 55/302 X |
| 4,885,014 | 12/1989 | Reinhardt et al. | 55/523 X |
| 5,059,227 | 10/1991 | Kilicaslan et al. | 55/523 X |
| 5,094,673 | 3/1992 | Kilicaslan et al. | 55/302 |
| 5,094,675 | 3/1992 | Pitt et al. | 95/20 |

FOREIGN PATENT DOCUMENTS

1646578  5/1991  U.S.S.R. ........................ 95/20

*Primary Examiner*—Richard L. Chiesa
*Attorney, Agent, or Firm*—Max Fogiel

[57] ABSTRACT

A device for filtering hot and dusty gases. The device uses hollow filter components. The components are accommodated in groups in a filter housing (1). Every group communicates with a filtered-gas manifold (21) outside the housing by way of a supply line (9) and a filtered-gas line (11). The supply lines extend individually out of the housing. A valve (13) is accommodated in every supply line. An instrument that determines the state of the filtered gas can also be accommodated in every supply line and/or filtered-gas line.

7 Claims, 2 Drawing Sheets

DEVICE FOR FILTERING HOT AND DUSTY GASES

BACKGROUND OF THE INVENTION

The present invention concerns a device for filtering hot and dusty gases using hollow filter components.

A hot-gas filter with tubes suspended from a perforated slab that divides the housing into an dusty-gas section and a filtered-gas section is known from German Patent 3 515 365. Dusty gas gets into the filtered gas when one of the tubes in this filter breaks and malfunctions. The whole filter has to be taken out of operation and the defective tube replaced to prevent too much dust and contaminants from getting into the filtered gas. The result is unnecessarily interrupted production.

The tubes in the filter housing disclosed in German OS 3 938 264, which is equivalent to European 0 433 637, are assigned group-by-group or row-by-row to individual headers that convey the filtered gas away. The ceramic tubes rest on or are positioned under the headers. The headers are distributed over the cross-section of the housing on one or more levels. The headers communicate with filtered-gas lines inside or outside the housing. There is also no way to handle the malfunctions that occur when one of these tubes breaks.

The ceramic tubes can be swept inside the housing of hot-gas filter known from German OS 3 938 264 (European 0 433 637) by injecting countercurrent bursts of a gas into the filtered-gas line. Measuring the pressure of the dusty gas and of the filtered gas to determine the difference is also known in this context (from U.S. Pat. No. 4 500 926). If the difference exceeds a prescribed threshold, a signal to sweep a specific group of filter components is emitted. The supply of dusty gas to that group is discontinued while it is being swept. The rate of flow of filtered gas through the header is measured and added to the difference that triggers the sweeping in another known approach (WIPO 88/07404). Even these techniques, however, reveal nothing about the state of a particular group of filter components in that the pressure and flow of the filtered gas is more or less determined from the gas leaving the housing.

SUMMARY OF THE INVENTION

The object of the present invention is an improvement in the generic device that will specify what particular tube has been damaged and accordingly keep dusty gas out of the filtered gas.

The point of departure for the invention is that the presence of a broken filter tube is revealed by a definite change in the state of the filtered gas. If groups of tubes are associated with specific headers as is in itself known, the change can be employed to specify what group the damaged tube is part of. A change in the state of the filtered gas can also be exploited to disengage the particular group, leaving the rest of filter in operation until it is time for its regular inspection. Any defective tubes can then be replaced during that inspection. Unnecessary down time will accordingly be avoided without detriment to the cleanliness of the filtered gas.

BRIEF DESCRIPTION OF THE DRAWINGS

Several embodiments of the invention will now be specified with reference to the drawing, wherein.

DESCRIPTION OF THE PREFERRED EMBODIMENTS

Figure 1:
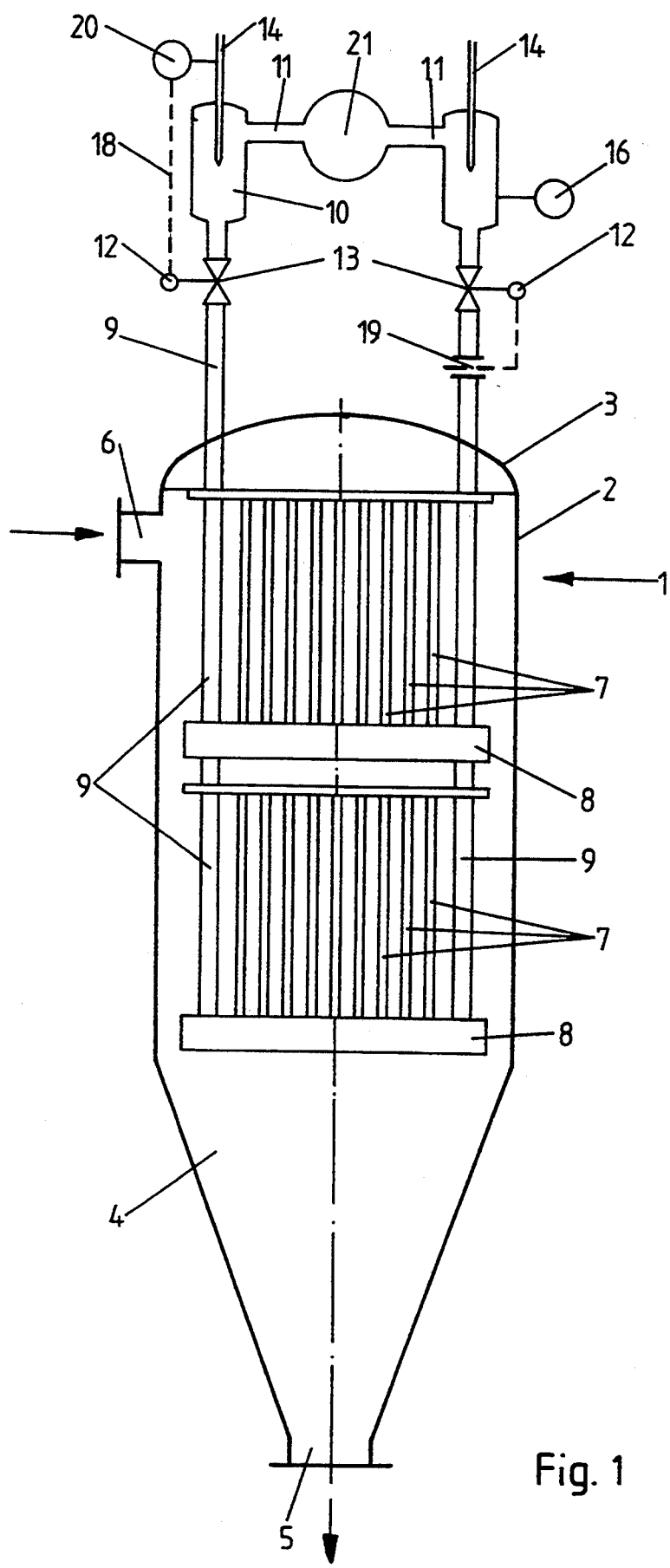
FIG. 1 is a schematic longitudinal section through a device for filtering gases and equipped with various instruments and FIG. 2 illustrates another instrument.

A device for filtering preferably hot and dusty compressed gases consists of a housing 1 with a cylindrical wall 2, a domed top 3, and a funnel-shaped bottom 4. The precipitated dust collects at the bottom, which tapers down to an outlet 5. Housing 1 also has an intake 6 for the dusty gas.

Housing 1 accommodates hollow filter components. Several components communicate with a single header 8. Header 8 collects the filtered gas and conveys it away. The components can be either hose sections or ceramic tubes 7 closed off at one end. Every header 8 accepts gas from a group of tubes 7 that either rest on it on appropriate connections or are suspended from it. Headers 8 are positioned adjacent on one or more levels. The headers can for example rest on a ring secured to the wall 2 of housing 1 or be suspended in the housing above tubes 7.

Each header 8 communicates with a supply line 9. Each supply line 9 extends out of housing 1 to a collector 10. Collectors 10 communicate with a line 11 that conveys the filtered gas to a manifold 21. The remote section of every supply line 9 accommodates a valve 13 that can be opened and closed by an actuator 12.

Coaxial with each supply line 9 is a lance 14. Lance 14 extends into collector 10 and terminates above the mouth of supply line 9. A gas can be injected into header 8 through lance 14 at a pressure above that of the dusty gas. The injected gas will shoot through filter tubes 7 and lift the filter cake off their outer surface.

Figure 2:
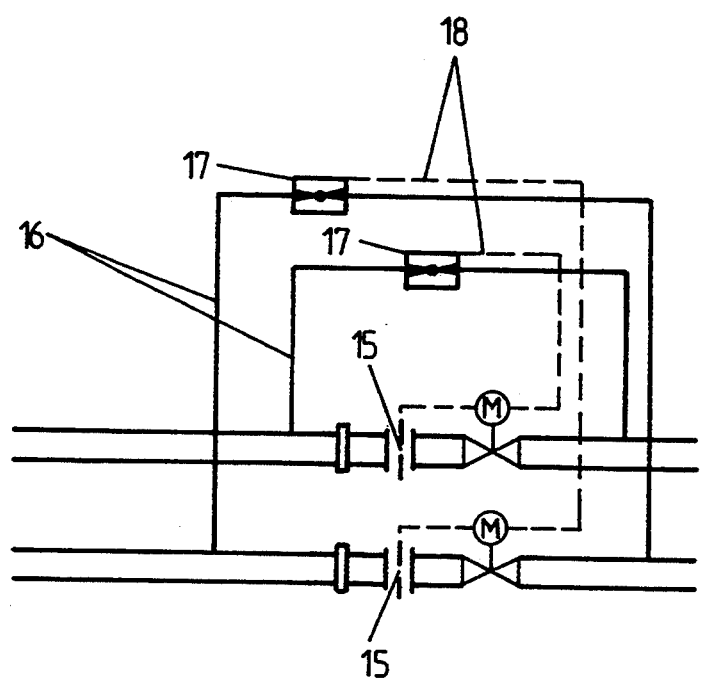

As will be evident from the detail in FIG. 2, every supply line 9 accommodates an sensor 15 in the form for example of an aperture that measures the flow per unit of volume of filtered gas through supply line 9. Communicating with each supply line 9 on each side of sensor 15 is a sampling line 16 that leads to a sensor 17. Sensor 17 measures the difference in pressure. Sensors 15 and 17 are connected by a control line 18 to an actuator 12 that opens and closes the valve 13 in the associated supply line 9. If sensors 15 and 17 indicate an impermissible discrepancy, it means that one or more of the filter tubes 7 associated with that line are defective. The controls can be adjusted such that in this event actuator 12 will receive a signal by way of control line 18 to close the valve 13 in the associated supply line 9. The valve can also be closed manually in the presence of such a signal. Sensors 15 and 17 can alternatively be accommodated in filtered-gas lines 11.

Another parameter that provides evidence about the state of the filtered gas when a filter tube 7 is defective is the density of dust. As illustrated in relation to the supply line 9 on the right of FIG. 1 a dust-density sensor 19 can be accommodated in every supply line 9 or in the section of every filtered-gas line 11 outside housing 1. Such a sensor 19 will be connected by way of a control line 18 with the actuator 12 that opens and closes the valve 13 in the same supply line 9. If dust-density sensor 19 detects opacity beyond a prescribed threshold, the condition will be ascribed to one or more defective filter tubes 7. Actuator 12 will receive a signal by way of control line 18 that leads to the closing of valve 13. Still another sensor that can identify a group of filter tubes 7 as a site of damage exploits the dynamic pressure at the filtered-gas end. This sensor is a pressure transducer 20 accommodated at an appropriate point in the filtered-gas line and detecting the dynamic pressure of the filtered gas in every supply line 9 or every collector 10 for example. It is preferable for pressure transducer 20 to be accommodated in sweeper lance 14. A broken filter tube 7 will be revealed by a change in the dynamic pressure of the filtered gas. Any change in the dynamic pressure detected is accordingly an indication that one or more of the filter tubes 7 associated with that sweeper lance 14 are defective. As already specified herein in relation to the aforesaid controls, a control line 18 leads to the actuator 12 that opens and closes valve 13. If the dynamic pressure deviates from a prescribed threshold, valve 13 can be closed automatically or manually.

As already specified herein, only one instrument, the sensors 15 and 17 that detect flow and pressure, dust sensor 19, or pressure transducer 20 for example, is associated with each group of filter tubes 7. To ensure even more reliable filter operation, even more instruments, functioning in accordance with a different principle, can be associated with the same supply line 9 and/or filtered-gas line 11 and be connected by way of a switching circuit with the actuator 12 that opens and closes valve 13.

We claim:

1. An arrangement for filtering hot and dusty gases, comprising: a filter housing; hollow filter elements positioned in groups in said filter housing; a filtered-gas manifold outside said housing and communicating with each of said groups through a supply line and a filtered-gas line, said supply line extending individually out of said housing; a valve positioned outside said housing in each said supply line; and measuring means positioned in at least one of said supply line and said filtered-gas line for determining the condition of the filtered gas, whereby a defective filter element can be isolated and penetration of unfiltered gas into filtered gas is avoided; a defective filter element being detected from changes in conditions of the filtered gas, said valve switching off the group of filter elements containing the defective filter element and leaving the remaining groups of filter elements operative.

2. An arrangement as defined in claim 1, wherein said measuring means comprises a first sensor for detecting flow per unit volume; a sampling line extending out of at least one of said supply line and said filtered-gas line on a first side of said first sensor and through a second sensor detecting differences in pressure, said sampling line returning into said supply line or said filtered gas line on a second side of said first sensor.

3. An arrangement as defined in claim 1, wherein said measuring means comprises a sensor for detecting density of dust in said filtered gas.

4. An arrangement as defined in claim 1, including transducer means downstream of said filter elements for detecting dynamic pressure of said filtered gas.

5. An arrangement as defined in claim 1, wherein said valve is controlled by said measuring means for determining the condition of said filtered gas.

6. An arrangement as defined in claim 1, including a plurality of measuring devices for measuring different properties; and switching means for connecting said measuring devices to said valve.

7. An arrangement for filtering hot and dusty gases, comprising: a filter housing; hollow filter elements positioned in groups in said filter housing; a filtered-gas manifold outside said housing and communicating with each of said groups through a supply line and a filtered-gas line, said supply line extending individually out of said housing; a valve positioned outside said housing in each said supply line; and measuring means positioned in at least one of said supply line and said filtered-gas line for determining the condition of the filtered gas, whereby a defective filter element can be isolated and penetration of unfiltered gas into filtered gas is avoided; a defective filter element being detected from changes in conditions of the filtered gas, said valve switching off the group of filter elements containing the defective filter element and leaving the remaining groups of filter elements operative; said measuring means comprising a first sensor for detecting flow per unit volume; a sampling line extending out of at least one of said supply line and said filtered-gas line on a first side of said first sensor and through a second sensor detecting differences in pressure, said sampling line returning into said supply line or said filtered-gas line on a second side of said first sensor; said measuring means comprising a sensor for detecting density of dust in said filtered gas; transducer means downstream of said filter elements for detecting dynamic pressure of said filtered gas; said valve being controlled by said measuring means for determining the condition of said filtered gas; a plurality of measuring devices for measuring different properties; and switching means for connecting said measuring devices to said valve.

* * * * *